United States Patent Office 3,431,261
Patented Mar. 4, 1969

3,431,261
DIFLUORAMINO COMPOUNDS
Andrew Harper Dinwoodie, Dalry, Godfrey Fort, Ardrossan, and James Brown Parker, Kilwinning, Scotland, assignors to Imperial Chemical Industries Limited, London, England, a corporation of Great Britain
No Drawing. Filed Feb. 19, 1965, Ser. No. 434,742
Claims priority, application Great Britain, Feb. 28, 1964, 8,517/64
U.S. Cl. 260—249.6                            16 Claims
Int. Cl. C07d 55/22, 49/34; C07c 103/30

The present invention relates to a process for preparing difluoramino compounds. Such compounds, in which the ratio of carbon to nitrogen atoms is not more than 6:1, are useful as high energy constituents of explosives. This invention also provides certain new difluoramino compounds.

According to the present invention a difluoramino compound is prepared by a method which comprises reacting difluoramine in an inert atmosphere in the presence of an acid catalyst with a compound of the general formula

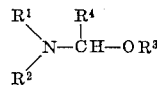

wherein $R^1$ represents a group having an electron attracting group adjacent to the nitrogen atom, which electron attracting group may, for example be carbonyl, $>C=NH$, N-substituted $>C=NH$, triazine ring or sulphonyl; $R^1$ may also be a divalent residue forming a ring with either $R^2$ or $R^3$ or with the carbon atom through $R^4$;

$R^2$ represents a mono- or divalent atom or group and may be, for example, hydrogen, alkyl or substituted alkyl. It may also be a divalent residue forming a ring with $R^1$ or $R^3$ or with the carbon atom through $R^4$;

$R^3$ represents hydrogen, alkyl or substituted alkyl;

$R^4$ represents hydrogen or a mono- or divalent substituted or unsubstituted hydrocarbon group which may be incorporated in or joined to $R^1$, $R^2$, or $R^3$ in a cyclic system. It may be a group having the formula:

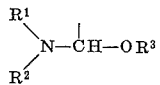

The general reaction may be represented as

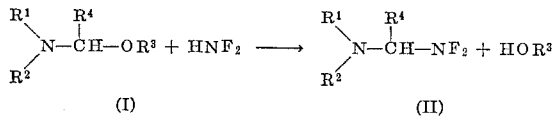

When $R^1$, $R^2$ or $R^4$ includes further

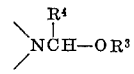

groups, these groups also react with further $HNF_2$ to give compounds with 2 or more difluoramino substituents.

By the term "inert atmosphere" is meant an atmosphere free from any constituent, such as oxygen, which reacts with difluoramine.

We have found concentrated sulphuric acid to be a suitable catalyst for the reaction.

Whilst the reaction may be carried out under a wide range of pressures, it is convenient to use autogenous pressure at ambient temperature or atmospheric pressure at lower temperatures.

The use of difluoramine in excess of the stoichiometric requirement for complete reaction helps to increase the yield. The process at atmospheric pressure may conveniently be carried out at about −23° C., the boiling point of difluoramine at atmospheric pressure, by refluxing the difluoramine during the reaction.

Compounds which give especially valuable explosive products when treated with difluoramine by the process of the invention include N-substituted derivatives of urea and melamine in which the substituent is hydroxymethyl or alkoxymethyl. Cyclic urea derivatives, in which a hydroxy or alkoxy group is attached to a carbon atom adjacent to the nitrogen atom, such as derivatives of imidazolidin-2-one also give very valuable products.

Certain compounds of Formula II, in which $R^4$ is hydrogen, have been described and claimed in our co-pending United States application Ser. No. 359,796, now U.S. Patent No. 3,375,259. These include N,N'-bis(difluoraminomethyl)urea and tetrakis(difluoraminomethyl)urea. The new compounds of the present invention include those compounds of Formula II in which $R^4$ is a group other than hydrogen or in which $R^4$ is hydrogen and either $R^1$ or $R^2$ is a cyclic group or forms part of a cyclic structure. These compounds include, for example, the following, hexakis(difluoraminomethyl)melamine,
4,5-bis(difluoramino)-imidazolidin-2-one,
1,3-bis(difluoraminomethyl)-4,5-bis(difluoramino)-imidazolidin-2-one,
1,3-diformyl 4,5-bis(difluoramino)imidazolidine,
1,2 diformamido-1,2-bis(difluoramino)ethane,
1,2-diacetomido-1,2-bis(difluoramino)ethane
1,2-di(carbethoxyamino)1,2-bis(difluoramino)ethane, and
1,2,2-tri(carbethoxyamino)-1-(difluoramino)ethane In addition to the above compounds the invention also provides N,N,N'-tris(difluoraminomethyl)urea, which has not previously been described or claimed.

The invention will be more clearly understood by reference to the following examples in which all parts and percentages are by weight.

Example 1

5 parts of difluoramine, generated by the acid hydrolysis of aqueous N,N-difluorourea solution, were refluxed for 4 hours using a solid $CO_2$/acetone "cold-finger" condenser on to 1.1 parts of N,N'-dimethylol urea under an atmosphere of nitrogen. 9 parts of 96 percent sulphuric acid were added and difluoramine reflux continued for a further 30 minutes. Excess difluoramine was allowed to vent off in a slow stream of nitrogen and the product mixture poured on to 100 parts of crushed ice. The aqueous mixture was extracted 5 times with 10 parts of diethyl ether and the ethereal solution dried for 24 hours over anhydrous sodium sulphate. The ether was then removed in a stream of nitrogen, leaving a white crystalline solid (M.P. 152° C.) which, after recrystallisation from a mixture of alcohol and ligroin, gave 0.9 part of product M.P. 162° C. Elemental analysis showed the product to contain C, 18.7%; H, 3.1%; N, 29.2%; F, 39.6%. This analysis was in accord with the theoretical composition of the compound N,N'-bis(difluoraminomethyl)urea which requires C, 18.9%; H, 3.2%; N, 29.5%; F, 40.0%.

On ignition the product flashed with a bright white flame. It failed to ignite when a ½ kg. mild steel hammer was dropped from a height of 10 centimetres on to a thin layer of the powder on a mild steel anvil but ignited when the height was 20 centimetres. When 0.1 g. of the product was heated in an open round-bottomed glass tube at a rate of 5° C. per minute, it exploded at 168° C.

Example 2

5 parts of difluoramine were refluxed for 1 hour on to 0.5 part of N,N'-di(methoxymethyl)urea under an atmosphere of nitrogen. 5 parts of 96 percent sulphuric acid were then added and difluoramine reflux continued for a further 4 hours. Excess difluoramine was then allowed to vent off and the product mixture poured on to 40 parts of crushed ice. 0.15 part of a white crystalline solid separated out and was filtered off. A further 0.32 part of the product was obtained by extracting the aqueous solution 3 times with 20 parts of diethyl ether, drying the ethereal layer with anhydrous sodium sulphate followed by removal of the ether. The product was a white crystalline material M.P. 157–8° C. Elemental analysis showed that it contained C, 19.4%; H, 2.9%; N, 28.7%; F, 39.5%. This analysis was in reasonable agreement with the theoretical composition of the compound N,N′-bis(difluoraminomethyl)urea which requires C, 18.9%; H, 3.2%; N, 29.5%; F, 40.0%. The infra-red spectrum and other properties of this product were identical with those of the product obtained in Example 1.

Example 3

1 part of N,N′-di(methoxymethyl)uron was placed in a thick-walled glass U-tube with valves on both arms. After cooling to −80° C., 3.5 parts of 96 percent sulphuric acid were added. 5 parts difluoramine were condensed in by passing a stream of difluoramine in nitrogen through the reactor at −80° C. The valves were closed and the tube left at 20° C. overnight.

After re-cooling to −80° C. the valves were opened and the difluoramine allowed to vent off up to room temperature. The residual sulphuric acid solution was extracted with methylene chloride. The extract was washed in turn with water, dilute sodium bicarbonate solution and water and dried over sodium sulphate. Evaporation at room temperature gave 0.55 part of a clear, colourless oil which showed only one peak by gas-liquid chromatography and analysis showed that it contained C, 18.5%; H, 3.3%; N, 25.9%; and F, 48.1%. This analysis was in accord with the theoretical composition of tetrakis(difluoraminomethyl)urea, $(F_2NCH_2)_2N.CO.N(CH_2NF_2)_2$, which requires C, 18.7%; H, 2.5%; N, 26.2% and F, 47.5% On ignition the product flashed with a bright flame.

The solution obtained by pouring the extracted sulphuric acid solution on to ice was extracted with diethyl ether. Removal of the ether gave 0.55 part of a viscous liquid which solidified on standing. Purification by sublimation under a high vacuum (less than 1 mm. Hg) at 100° C. gave white crystals. This material was found to have a melting point of 76–78° C. and analysis showed that it contained C, 19.1%; H, 2.9% and N, 28.2% and F, 42.7%. This analysis was in reasonable agreement with the theoretical composition of the compound N,N,N′-tris(difluoraminomethyl)urea, $$(F_2NCH_2)_2N.CO.NHCH_2NF_2$$

which requires C, 18.8%; H, 2.7%; N, 27.4% and F, 44.7%. This product also flashed with a bright flame when ignited.

Example 4

1 part of hexakis(methoxymethyl)melamine, prepared as a syrup by a known method, was refluxed with 5 parts of difluoramine at atmospheric pressure for 9 hours. 3 parts of 96 percent sulphuric acid were added dropwise over 5 minutes and the difluoramine reflux was continued for a further 4½ hours. Excess difluoramine was allowed to vent off in a slow stream of nitrogen and the reaction mixture poured over 100 parts of crushed ice. A solid was formed which was removed, dissolved in diethyl ether, washed with aqueous sodium bicarbonate solution and evaporated to give an off-white solid. The rest of the product was isolated by extraction of the aqueous sulphuric acid solution with diethyl ether, and washing the extract in turn with aqueous sodium bicarbonate solution and water. The solid softened between 60° and 70° C., and was soluble in acetone, benzene and chloroform. Analysis showed that it contained C, 25.2%; H, 3.7%; N, 33.3%; F, 39.2% and no methoxyl groups. The molecular weight, determined by the ebullioscopic method in acetone, was 707. This analysis was in reasonable agreement with the theoretical composition of the compound hexakis(difluoraminomethyl)melamine, $$C_9H_{12}F_{12}N_{12}$$

which requires C, 21.0%; H, 2.3%; N, 32.6%; F, 44.2%; no methoxy groups and a molecular weight of 516.

On ignition the product flashed with a bright flame.

Example 5

5 parts of difluoramine were refluxed for 2 hours on to 0.5 part of 4,5-dihydroxy-imidazolidin-2-one under an atmosphere of nitrogen. 5 parts of 96% sulphuric acid were added and difluoramine reflux continued for a further 3½ hours. Excess difluoramine was vented off in an atmosphere of nitrogen and the mixture then poured on to 40 parts of ice. The aqueous solution was extracted 3 times with 15 parts of diethyl ether and the ethereal solution dried over anhydrous sodium sulphate. Removal of the ether yielded 0.4 part of a white crystalline product which on ignition flashed with a bright flame. Recrystallisation from benzene gave a product with a melting point of 172–3° C. Elemental analysis showed the product to contain C, 19.4%; H, 1.9%; N, 29.8%; F, 39.9%. This analysis was in reasonable agreement with the theoretical composition of the compound 4,5-bis(difluoramino)imidazolidin-2-one,

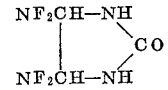

which requires C, 19.2%; H, 2.1%; N, 29.8%; F, 40.4%.

On ignition the product flashed with a bright flame. It failed to ignite when a ½ kg. mild steel hammer was dropped from a height of 10 centimetres on to a thin layer of the powder on a mild steel anvil, but ignited when the height was 20 centimetres. When 0.1 g. of the material was heated to 250° C. in an open round-bottomed glass tube at a rate of 5° C. per minute, it did not explode.

Example 6

Excess difluoramine was refluxed on to 52 parts of 4,5-dimethoxy-imidazolidin-2-one for 1 hour in an atmosphere of nitrogen at atmospheric pressure. 550 parts of 96 percent sulphuric acid were added and refluxing continued for a further 5 hours. Venting off the difluoramine in a stream of nitrogen at room temperature, pouring the reaction mixture over ice and ether extraction, gave 52 parts (78% of theory) of 4,5-bis(difluoramino)-imidazolidin-2-one melting at 172–173° C.

Example 7

57 parts of 4,5-diethoxy-imidazolidin-2-one were reacted as in Example 6 with excess difluoramine in presence of sulphuric acid for 2 hours and gave 52 parts (85% of theory) of 4,5-bis(difluoramino)imidazolidin-2-one melting at 172° C.

Example 8

300 parts of difluoramine were refluxed on to 55.3 parts of 1,3-di(methoxymethyl)-4,5-dimethoxy-imidazolidin-2-one for 1 hour in an atmosphere of nitrogen at atmospheric pressure. 550 parts of 96% sulphuric acid were added and refluxing continued for 6 hours. Unreacted difluoramine was then blown off in a stream of nitrogen at room temperature. Pouring the residual liquid onto ice caused a liquid product to separate which was isolated by ether extraction, washing the ether extract with dilute aqueous sodium bicarbonate solution, drying over anhydrous sodium sulphate and removal of the ether in a stream of dry nitrogen at room temperature. 64.8 parts of colourless liquid (86% of theory) were isolated and, after storage in a vacuum desiccator over phosphorous pentoxide, were found to contain C, 18.95%; H, 2.0%; N, 26.6%; F, 47.3% and to have molecular weight 324 (ebullioscopic method in acetone solution).

1,3 - bis(difluoraminomethyl) - 4,5 - bis(difluoramino)-imidazolidin-2-one, $C_5H_6ON_6F_8$, requires C, 18.9%; H, 1.9%; N, 26.4%; F, 47.8%; M.W., 318.

The product failed to ignite when a ½ kg. mild steel hammer was dropped from a height of 5 cm. on to a thin layer of the liquid on a mild steel anvil but ignited when the height was 10 cm.

Example 9

Excess difluoramine (300 parts approximately) was refluxed on to 72.3 parts of 1,3-diformyl-4,5-dihydroxy-imidazolidine for 1 hour in an atmosphere of nitrogen at atmospheric pressure. 368 parts of 96% sulphuric acid were then added and refluxing continued for 4 hours. The difluoramine was removed in a stream of nitrogen at room temperature and the residual solution poured on to ice to give a white solid which was washed with water. Further washing with dilute aqueous sodium bicarbonate solution and water and drying in vacuo over phosphorus pentoxide gave 21.2 parts (20% of theory) of a solid which melted sharply at 118° C. and was shown to contain C, 25.5%; H, 2.95%; N, 24.1%; F, 31.45%. 1,3-diformyl-4,5-bis(difluoramino)imidazolidine, $C_5H_6O_2N_4F_4$ requires C, 26.1%; H, 2.61%; N, 24.3%; F, 33.0%.

Example 10

Excess difluoramine was refluxed for 4 hours on to 10.0 parts 1,2-diformamido-1,2-dihydroxy ethane in an atmosphere of nitrogen at atmospheric pressure. 72 parts of 96% sulphuric acid were added gradually and reflux continued for a further 4 hours. After removal of excess difluoramine the reaction mixture was poured over crushed ice to give 9.0 parts of a white solid, M.P. 156° C. Elemental analysis of the product showed that it contained C, 22.8%; H, 2.9%; N, 25.9%; F, 32.5%. 1,2-diformamido - 1,2-bis(difluoramino)ethane, $C_4H_6F_4N_4O_2$, requires C, 22.0%; H, 2.8%; N, 25.7%; F, 34.9%.

Example 11

Excess difluoramine was refluxed on to 100 parts of 1,2-diacetamido-1,2-dihydroxy ethane for 1 hour in an atmosphere of nitrogen at atmospheric pressure. 550 parts of 96% sulphuric acid were added gradually and refluxing continued for 4½ hours. The unreacted difluoramine was blown off in a stream of nitrogen at room temperature and the resulting solution poured over ice to give 12.5 parts (9% of theory) of a white solid which was washed with water and dried in vacuo at room temperature over phosphorus pentoxide. The solid melted with decomposition at 194° C. Recrystallisation from hot aqueous ethanol gave needles melting at 197–198° C. (decomp.) and containing C, 29.5%; H, 4.05%; N. 22.9%; F, 29.7%. 1,2-diacetamido - 1,2 - bis(difluoramino)ethane requires, C, 29.3%; H, 4.07%; N, 22.8%; F, 30.9%.

Example 12

Excess difluoramine was refluxed for 4 hours on to 10.0 parts of 1,2-diacetamido-1,2-dimethoxy ethane in an atmosphere of nitrogen at atmospheric pressure. 72 parts of 96% sulphuric acid were added gradually and reflux continued for a further 4 hours. Treatment of the reaction mixture as described in Example 11 yielded 5.5 parts of 1,2-diacetamido-1,2-bis(difluoramino)ethane.

Example 13

Excess difluoramine was refluxed on to 66.4 parts of 1,2-di(carbethoxyamino)-1,2-dihydroxy ethane for 1 hour under a nitrogen atmosphere at atmospheric pressure. 550 parts of 96% sulphuric acid were added and refluxing continued for 3 hours. Unreacted difluoramine was removed in a stream of nitrogen at room temperature and the residual clear solution poured on to ice. The white solid which precipitated was washed thoroughly with water and dried in vacuo over phosphorus pentoxide. 62.7 parts (73% of theory) of solid product were obtained. The product contained C, 31.9%; H, 4.57%; N, 18.8%; F, 24.0%. 1,2-di(carbethoxyamino)-1,2-bis(difluoramino) ethane, $C_8H_{14}O_4N_4F_4$, requires C. 31.4%; H, 4.6%; N, 18.3%; F, 24.8%. After recrystallisation from ethanol/ligroin the product (needles) melted at 210–212° C. and contained F, 24.6%.

Example 14

Excess difluoramine was refluxed for 4 hours on to 10.2 parts of 1,2-di(carbethoxyamino)-1,2-dimethoxy ethane in an atmosphere of nitrogen at atmospheric pressure. 72 parts of 96% sulphuric acid were added gradually and reflux continued for a further 4 hours. After removal of excess difluoramine the reaction mixture was poured on to crushed ice to give a white solid which was washed with water and dried in vacuo at room temperature over phosphorus pentoxide. The yield was 8.5 parts of a solid containing C, 31.8%; H, 4.6%; N, 20.7%; F, 25.1%. 1,2-di (carbethoxyamino)-1,2-bis(difluoramino)ethane, $C_8H_{14}N_4F_4O_4$ requires C, 31.4%; H, 4.6%; N, 18.3%; F, 24.8%.

Example 15

Excess difluoramine (300 parts approximately) was refluxed on to 109 parts of hexamethylolmelamine monohydrate for 2 hours under a nitrogen atmosphere at atmospheric pressure. 740 parts of 96% sulphuric acid were added and refluxing continued for 9 hours. The apparatus was then allowed to warm up to room temperature and unreacted difluoramine was vented off overnight in a slow stream of nitrogen. The residual clear solution was poured on to ice to give a sticky solid which was washed repeatedly with warm water and then dried under vacuum over calcium chloride to give 150 parts of a partially crystalline, colourless solid. This was purified by dissolving in 525 parts of cold glacial acetic acid and adding 100 parts of water with stirring. Crystals separated almost at once and were filtered off, washed with water and dried under vacuum over phosphorus pentoxide. The crystalline material (68.2 parts) was further purified by recrystallisation from hot carbon tetrachloride to give 55.8 parts (30% yield) of pure product (needles) melting at 138–140° and containing C, 21.4%; H, 2.5%; N, 33.7%; F, 43.1%. The M.W. was 509 (ebullioscopic method in acetone). Hexakis (difluoraminomethyl)melamine, $C_9H_{12}N_{12}F_{12}$ requires C, 20.9%; H, 2.3%; N, 32.6%; F, 44.2%; M.W. 516.

The product failed to ignite when a ½ kg. mild steel hammer was dropped from a height of 5 cm. on to a thin layer of the solid on a mild steel anvil but ignited when the height was 10 cm. When 0.1 g. of the product was heated to 260° C. in an open round-bottomed glass tube at a rate of 5° C. per minute, it did not ignite.

Example 16

Excess difluoramine (300 parts approximately) was refluxed on to 116 parts of 1,2,2-tri(carbethoxyamino)ethanol for 1 hour under a nitrogen atmosphere at atmospheric pressure. 550 parts of 96% sulphuric acid were added and refluxing continued for 3½ hours. Unreacted difluoramine was removed in a stream of nitrogen at room temperature and the residual clear solution poured on to ice. The white solid which precipitated was filtered off, washed well with water and dried in vacuo over phosphorus pentoxide. 112 parts of a crude solid product were obtained and after recrystallisation from hot acetonitrile gave microscopic needles melting sharply with decomposition at 180.5° C. and containing C, 38.8%; H, 5.96%; N, 16.9%; F, 9.7%. 1,2,2-tri(carbethoxyamino)-1-(difluoramino)ethane, $C_{11}H_{20}O_6N_4F_2$ requires C, 38.6%; H, 5.85%; N, 16.4%; F, 11.1%.

What we claim is:

1. A process for the preparation of a difluoramino compound which comprises reacting difluoramine in an inert atmosphere in the presence of an acid catalyst with a compound of the general formula:

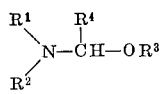

wherein $R^1$ is selected from the class consisting of monovalent and divalent radicals having an electron attracting group adjacent the nitrogen atom, said radicals being composed of atoms selected from the group consisting of carbon, hydrogen, oxygen and nitrogen atoms;

$R^2$ is selected from the class consisting of hydrogen, alkyl and the atoms necessary to form a ring with $R^1$, $R^3$ or $R^4$ selected from the group consisting of carbon, hydrogen, oxygen and nitrogen atoms;

$R^3$ is selected from the class consisting of hydrogen, alkyl and the atoms necessary to form a ring with $R^1$, $R^2$ or $R^4$ selected from the group consisting of carbon, hydrogen, oxygen and nitrogen atoms; and $R^4$ is selected from the class consisting of hydrogen, hydrocarbon radicals, the grouping of the formula

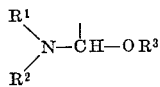

and the atoms necessary to form a ring with $R^1$, $R^2$ or $R^3$ selected from the group consisting of carbon, hydrogen, oxygen and nitrogen atoms.

2. A process as claimed in claim 1 wherein the acid catalyst is concentrated sulphuric acid.

3. A process as claimed in claim 1 wherein difluoramine is present in excess.

4. A process as claimed in claim 1 wherein the reaction is carried out at atmospheric pressure in conditions of difluoramine reflux.

5. A process as claimed in claim 1 wherein difluoramine is reacted with a member of the group consisting of (1) N-substituted derivatives of urea and melamine in which the substituent is selected from hydroxymethyl and alkoxymethyl and (2) a cyclic urea derivative in which the nitrogen atoms of the urea are joined through chemically linked atoms selected from carbon, nitrogen and oxygen atoms.

6. A process as claimed in claim 1 in which difluoramine is reacted with a compound selected from the group consisting of N,N'-dimethylol urea, N,N'-di(methoxymethyl)urea, N,N' - di(methoxymethyl)uron, hexakis(methoxymethyl)melamine, 4,5 - dihydroxy-imidazolidin-2-one, 4,5-dimethoxy-imidazolidin-2-one, 4,5 - diethoxy-imidazolidin-2-one, 1,3-di(methoxymethyl)-4,5 - dimethoxy-imidazolidin-2-one, 1,3-diformyl-4,5-dihydroxy-imidazolidine, 1,2-diformamido-1,2-dihydroxy ethane, 1,2-diacetamido-1,2-dihdroxy ethane, 1,2-diacetamido-1,2-dimethoxy ethane, 1,2-di(carbethoxyamino)-1,2-dihydroxy ethane, 1,2-di(carbethoxyamino)-1,2-dimethoxy ethane, hexamethylolmelamine, and 1,2,2-tri(carbethoxyamino) ethanol.

7. A process as in claim 1 wherein $R^1$ is a radical selected from the group consisting of carbonyl, triazine and sulphonyl.

8. A compound of the general formula

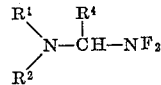

wherein $R^1$ and $R^2$ have the meanings given in claim 1 and $R^4$ also has the same meaning as given in claim 1 except that it is a group other than hydrogen unless either $R^1$ or $R^2$ is a cyclic group or forms part of a cyclic structure.

9. The compound hexakis(difluoraminomethyl)melamine.

10. The compound 4,5-bis(difluoramino)imidazolidin-2-one.

11. The compound 1,3-bis(difluoraminomethyl)-4,5-bis(difluoramino)imidazolidin-2-one.

12. The compound 1,3-diformyl-4,5-bis(difluoramino) imidazolidine.

13. The compound 1,2-diformamido-1,2 - bis(difluoramino)ethane.

14. The compound 1,2-diacetamido - 1,2-bis(difluoramino)ethane.

15. The compound 1,2-di(carbethoxyamino)-1,2-bis(difluoramino)ethane.

16. The compound 1,2,2-tri(carbethoxyamino)-1-difluoramino)ethane.

References Cited

Hoffman et al.: Chem. Reviews, vol. 62, pp. 7 and 14 (1962), QD 1 A563.

LELAND A. SEBASTIAN, *Primary Examiner.*

U.S. Cl. X.R.

149—109; 260—239, 309.7, 534, 553, 561, 583